Aug. 17, 1948.  G. A. LYON  2,447,021
TRIM RING FOR VEHICLE WHEELS
Filed Feb. 25, 1943  2 Sheets-Sheet 1
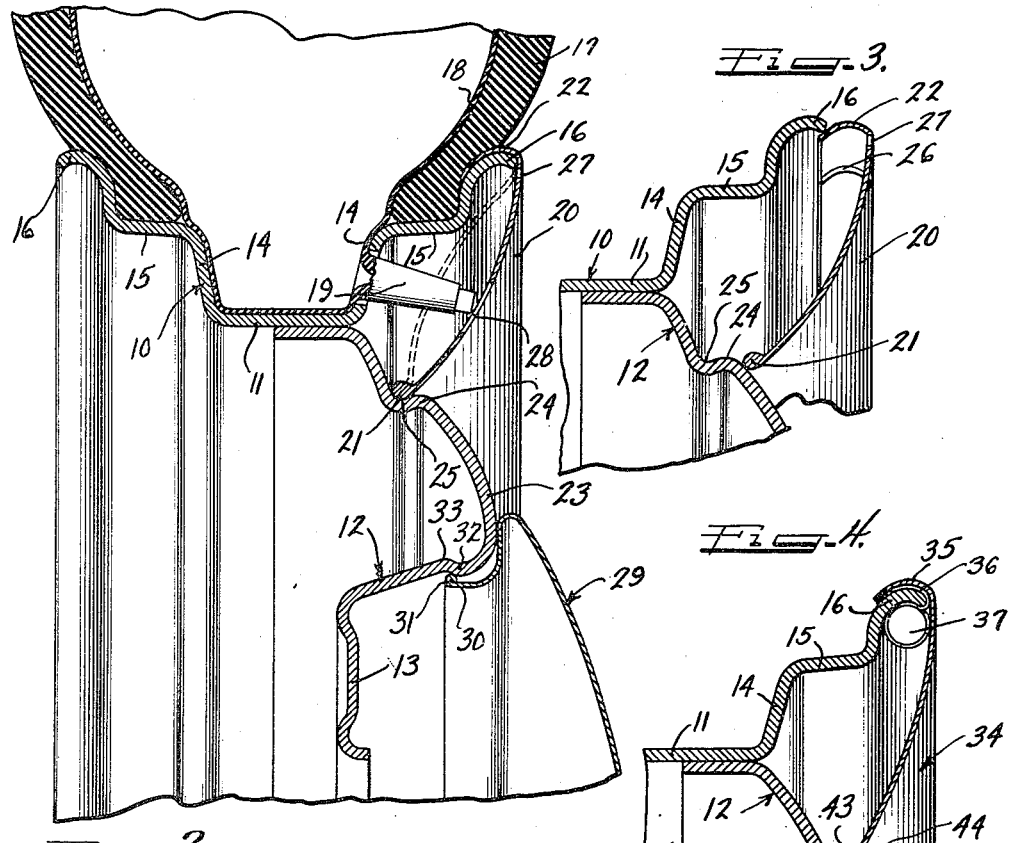
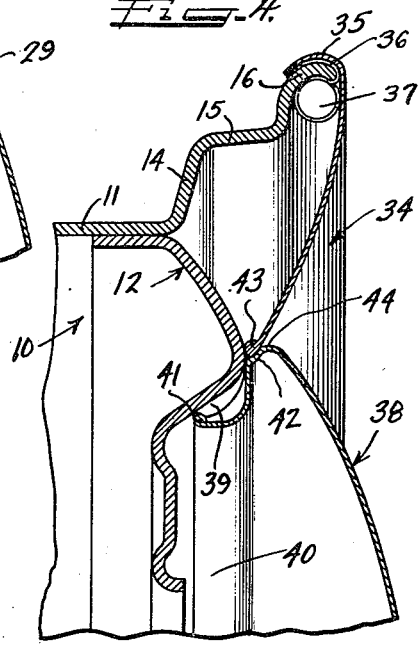
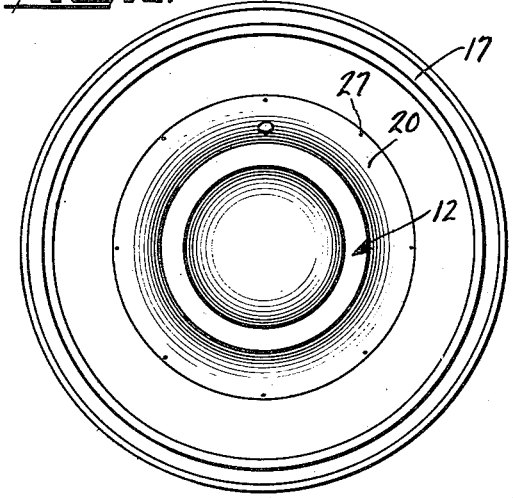
Inventor
GEORGE ALBERT LYON.
by Charles W. Hill Attys.

Aug. 17, 1948. G. A. LYON 2,447,021
TRIM RING FOR VEHICLE WHEELS
Filed Feb. 25, 1943 2 Sheets-Sheet 2
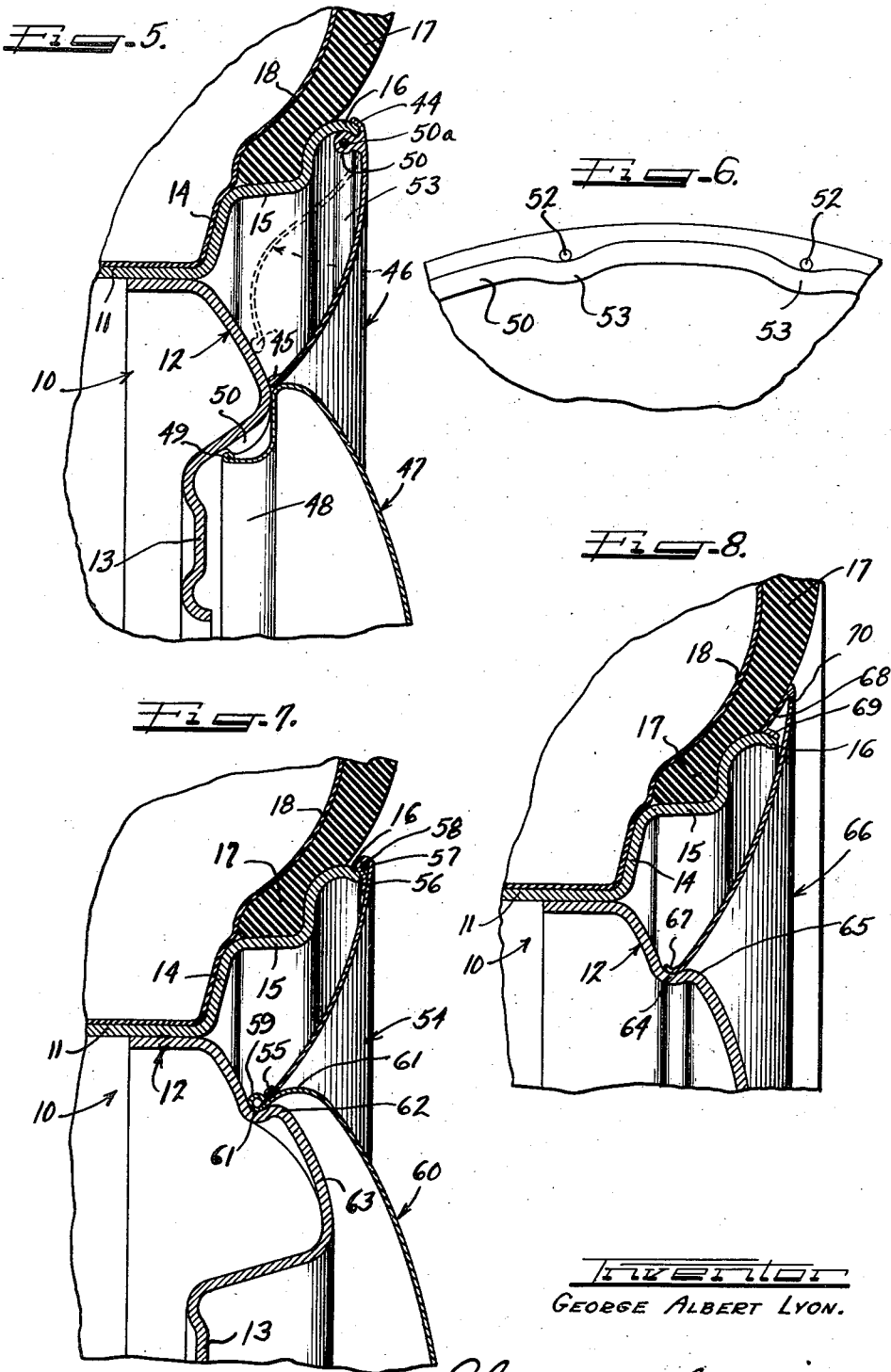
Inventor
GEORGE ALBERT LYON.
by Charles W. Hill Attys.

Patented Aug. 17, 1948

2,447,021

UNITED STATES PATENT OFFICE 2,447,021

TRIM RING FOR VEHICLE WHEELS

George Albert Lyon, Allenhurst, N. J.

Application February 25, 1943, Serial No. 476,999

2 Claims. (Cl. 301—37)

This invention relates to an improved wheel trim structure and is directed particularly to a trim structure which more readily blends with the wheel structure and a tire thereon and at the same time renders the wheel accessories available for servicing.

An important object of the invention is to provide a wheel cover which is constructed with such a cross-sectional curvature that the flanges of the tire rim are concealed and the cover itself simulates the curvature of the sidewall of the tire to present in effect a massive tire on a centrally disposed supporting structure of minimum dimensions.

Another object of the invention is to provide, in a wheel structure, a cover assembly which effectively conceals or substantially conceals the tire valve stem and conceals wheel balancing weights or other appurtenances which may be associated with the tire rim and which, when colored white, is so arranged as to constitute, in effect, the side wall of a tire or the wheel to give the appearance of a white side wall of the tire.

Still another object of the invention is to provide an improved wheel cover whereby the accessories on a wheel structure to which the cover is attached are readily available for servicing without requiring repeated removal of the cover member itself.

Still another object of the invention is to provide, for a wheel structure of an automobile or the like, an improved cover assembly which effectively conceals the outer side of the tire flanges of the tire rim together with the appurtenances thereon and which is so constructed as to be locally distortable to provide access to the rear of the cover member and to the said appurtenances.

Still another object of the invention is to provide an improved attachment and retaining arrangement for a cover member which is resiliently, locally flexible to afford access to the rear side thereof.

A still further object of the invention is to provide for a wheel structure, an improved cover assembly wherein the outer peripheral edge of the cover member is positively engaged in attaching relationship with the tire rim yet is releasable to provide access to the rear of the cover when the latter is flexed locally.

In accordance with the general features of this invention there is provided herein a wheel structure including a tire rim in which a tire is mounted and a locally flexible or pliable cover member constructed from a synthetic plastic such as for instance, cellulose acetate, or rubber, by a molding or pressing process, this cover member extending over the outer side of the tire rim, having a portion thereof bearing against the outer side of the wheel structure and a radially outwardly disposed portion thereof positively engaging the edge portion of the tire rim, the cover member being maintained in attached position under a condition of stress to give increased support thereto and added security to the attachment.

A still further object of the invention is to provide for a wheel structure, a cover assembly including a radially outer annular portion and a central hub cap portion, the outer annular portion being constructed to be locally pliable or flexible thereby to be movable to afford access for a pry-off tool so that the hub cap portion may be removed from the wheel structure without necessitating removal of the outer annular portion.

Still another important object of the invention is to provide an ornamental cover assembly which is so constructed that it covers the outer portion of a tire rim to which it is secured and effectively conceals appurtenances associated with the tire rim such as wheel balancing weights and the tire valve stem and which is arranged so that the outer peripheral portion thereof is detachably secured to the wheel structure by engagement with the tire rim, a tire mounted therein, or both.

Other objects and advantages of the invention will become apparent from the following description and accompanying drawings, in which:

Figure 1 is a fragmentary cross-sectional elevation of a wheel assembly embodying my invention;

Figure 2 is a side elevation of a wheel assembly such as that shown in Figure 1;

Figure 3 is an enlarged fragmentary cross-sectional view of the construction shown in Figure 1, the position of the cover member being shown just prior to its final attachment to the wheel assembly;

Figure 4 is a fragmentary cross-sectional view of a wheel assembly embodying a modified form of my invention;

Figure 5 is a fragmentary cross-sectional view of a wheel assembly embodying a still further modified form of my invention;

Figure 6 is a fragmentary rear elevational view of the radially outer peripheral portion of the cover assembly shown in Figure 5;

Figure 7 is a fragmentary cross-sectional view of another modified form of my invention; and Figure 8 is a fragmentary cross-sectional view of still another modified form of my invention.

As shown in the drawings:

The reference character 10 designates generally a multi-flange, drop-center type of tire rim which is connected as by riveting or welding or the like through a base flange 11 to a central body part or spider 12 which includes a central bolt-on flange 13. The drop-center rim 10 is further provided with opposite side flanges 14, opposite intermediate flanges 15, and opposite edge portions 16. A suitable tire 17 having an inner tube 18 and a valve stem 19 is mounted upon the rim, one of the side walls 14 having an orifice through which the valve stem 19 may project.

In providing a cover member constructed in accordance with my invention, I contemplate the provision of a cover which is constructed with a cross-sectional curvature of such configuration and magnitude that it will overlie at least the entire outer part of the multi-flange tire rim and extend into the body part or spider 12, the radially outer periphery thereof extending outwardly a distance sufficient to conceal the edge portion of the tire rim. With such a construction the desirable ornamental effect is obtained in that the tire rim and the appurtenances associated therewith, such as the tire valve and wheel balancing weights, are effectively concealed.

Furthermore the radial expanse and the contour of the cover member so configurated is such that it constitutes in effect a continuation of the side wall of the tire and gives the appearance of a massive tire without requiring the extremely high cost which would be involved in manufacturing a tire of such massive proportions.

In view of the fact that wheel balancing weights must be occasionally adjusted to accommodate for uneven wear of the tires and the like, and in view of the further fact that the tires must be repeatedly inflated to retain in them the desired air pressure, it will be seen that concealment of these appurtenances behind a cover member would normally necessitate repeated removal of the cover member. In carrying out my invention, however, I contemplate the provision of a locally pliable or flexible, resilient trim or cover member which is so arranged that while normally it is positively engaged at an outer part thereof on the edge portion of the tire rim, it may be easily released therefrom at a portion of the outer periphery in order to provide access to the rear side thereof and to the appurtenances housed therebehind.

As shown in Figure 1 of the drawings, an annular cover member 20, which in the present instance is in the form of an annulus, is provided with an enlarged bead or integral reenforcing ring 21 at the inner periphery thereof, and has its outer peripheral margin formed as at 22 to provide a substantially axially inwardly extending flange. It will be seen that the cover member 20, instead of extending sharply inwardly as has been the common practice in the past, is provided with such a transverse cross-sectional curvature that it presents a gradual curve inwardly somewhat similar to the curve of a side wall of the tire 17.

Furthermore, the radial expanse of the cover member 20 is such that it extends from the edge portion 16, radially inwardly a distance sufficiently great so that it overlies a portion of the body part or spider 12. As will be seen clearly from Figure 1, the curvature of the cover member 20 is such that sufficient space is provided therebehind to effectively conceal the tire valve 19.

As previously explained, the cover member 20 is preferably constructed from a synthetic plastic, natural rubber or synthetic rubber, or, under certain circumstances, of a very thin, springy metal, and accordingly it is highly desirable that the cover be supported not only at the inner part thereof, but also at the outer part thereof.

Many different expedients may be utilized for anchoring or attaching the radially inner periphery of the cover member to the wheel structure. However, in the present instance, the body part or spider 12 is cross-sectionally configurated so as to afford protuberances 23 at a plurality of points thereon, these protuberances being constructed to provide humps 24 and radially outwardly facing grooves 25. These protuberances may either be in the form of spaced humps or may constitute an annular protuberance on the face of the spider.

As will best be seen from Figure 3, the assembly of the cover member 20 into its attached position shown in Figure 1 is accomplished by placing the reenforcing bead 21 of the inner periphery thereof against the outer part of the humps 24, whereupon it may be pressed radially inwardly to snap into the grooves 25. This assembly movement involves a slight distortion of the reenforcing bead 21 as it passes over the humps 24, whereby resiliency or elasticity which permits the bead 21 to ride over the hump 24 is attained. Preferably, the radial position of the bottom of the grooves 25 with respect to the wheel structure is such that a slight amount of this distortion of the inner periphery of the cover member is retained after the bead 21 is lodged in the groove. In this manner, the inner periphery of the cover member 20 is retained on the wheel structure under a condition of stress and thus the attachment is more secure.

As will also be seen from Figure 3, before the flange 22 of the cover member 20 is urged into its ultimate position as shown in Figure 1 the terminal edge thereof is disposed radially inwardly of the outer edge of the edge portion 16 of the wheel rim. After the bead 21 is assembled in its ultimate position as previously described, it is merely necessary to draw the terminal edge of the flange 22 radially outwardly and snap it over the edge portion 16 whereupon it assumes the position shown in Figure 1. Thus, when the tire 17 is inflated it will be pressed outwardly against the edge portion 16 and the flange 22 lying thereover to afford an extremely secure attachment for the outer peripheral edge of the cover member. If desired, the assembly of the flange 22 over the edge portion 16 may be facilitated by the provision of one or more slots 26 which increase the radial outwardly flexing properties thereof.

It will be understood that if the tire is already on the rim during the assembly of the flange 22 over the edge portion 16 the flange may be readily and quickly worked downwardly into the position between the tire and the rim as shown in Figure 1 because it is constructed from relatively thin stock. If desired, the flange 22 may be shorter than shown so as not to extend beneath the tire.

As will be seen from Figure 1, the cover member 20 when disposed in its ultimate position will be slightly distorted radially by the engagement of the flange 22 over the edge portion 16 and thus will be maintained on the wheel structure in a condition of stress.

To the end that water and other foreign matter which might become entrapped between the wheel structure and the cover member 20 may be expelled from the chamber so formed, the cover member 20 is preferably provided with a plurality of apertures 27 at the part thereof immediately radially inwardly of the junction thereof with the flange 22. With this construction it will be seen that expulsion of foreign matter will be greatly aided by the centrifugal forces imposed during the rotation of the wheel structure.

As previously indicated, the cover member may be formed from a synthetic plastic or from rubber, and it is contemplated that either a molding or a pressing process may be utilized for forming it into the configuration shown in Figure 3.

The cover member constructed in accordance with the embodiment shown in Figures 1, 2 and 3 is effective to cover the entire outer part of the tire rim and also is effective to conceal appurtenances such as the tire valve stem and wheel weights which are associated with the tire rim. As shown in Figure 1, the tire valve stem 19 is of such a length that it does not extend beyond the plane occupied by the cover member 20 when it is in its final position, and accordingly an orifice 28 is provided in the cover member to afford access to the valve stem for inflating the tire.

As indicated previously, it is within the contemplation of my invention that the cover member 20 shall be locally deformable so that portions thereof may be flexed relative to the remainder thereof in order that access to parts of the wheel structure disposed on the inner side of the cover member may be obtained. Accordingly, if it is desired to inflate the tire, it is merely necessary to press the portion of the cover member bordering the orifice 28 radially inwardly into a position shown in dotted lines in Figure 1, whereupon the connection between the air hose and the valve may be made. If it is desired to gain access to the rear of the cover member for adjustment of wheel balancing weights or the like, it is merely necessary to pry the terminal edge of the flange 22 thereof outwardly and over the edge portion 16, whereupon the adjacent portion of the cover member may be flexed axially outwardly and radially inwardly, thus providing ample room for tools and the like necessary to remove or insert the weights or the like.

The construction of the embodiment shown in Figure 1 may be completed by the application of a hub-cap simulating member 29 which is provided with an axially inwardly extending snap-on flange 30 terminating in a peripheral bead 31.

To the end that the hub cap may be securely attached to the wheel structure, the protuberances 23 are so cross-sectionally configurated as to provide radially inwardly extending humps 32 and radially inwardly opening grooves 33. The application of the hub cap to the wheel structure is accomplished by merely urging the same axially inwardly, whereupon the bead 31 overrides the humps 32 and ultimately lodges in the grooves 33.

In the modification shown in Figure 4, the cover member 34 is provided with a cross-sectional configuration generally similar to that in the embodiment shown in Figures 1, 2 and 3. The outer peripheral edge thereof is anchored to the rim by means of a terminal flange 35 which extends axially inwardly over the upper surface of the edge portion 16 of the tire rim. The flange 35, as is the case with the flange 22 of Figures 1, 2 and 3, may be of a length sufficient to be disposed between the edge portion 16 and the tire when the latter is inflated, or, if desired, may be shorter so that it merely extends up to the junction of the tire with the edge portion 16. In Figure 4 the manner of cooperation between the edge portion 16, the retaining clip 36 of the wheel weight 37, and the flange 35 is clearly shown, the clip 36 overlying the edge portion 16 while the flange 37 overlies the clip. In the construction of Figure 4, the cover assembly includes the aforementioned cover member 34 and a central hub cap portion 38 which is arranged to extend over the central part of the spider 12 and radially outwardly to the inner periphery of the cover portion 34.

While a number of different expedients may be utilized in securing the hub cap portion 38 to the wheel structure, the spider 12 herein is so cross-sectionally configurated as to provide a series of concentrically disposed humps 39 over which the axially inwardly extending flange 40 and the terminal bead 41 of the hub cap portion may be urged in snap-on, pry-off relationship.

In the construction of Figure 4, the hub cap 38 is cross-sectionally configurated to present a substantially radially outwardly facing groove 42 into which the bead 43 at the inner peripheral edge of the cover member 34 may fit when the cover members are assembled on the wheel. With such a construction, it will be seen that the bead 43 is lodged in the groove 42 of the hub cap portion 38 and is held securely between the hub cap and the spider 12, the bead 44 formed by the radially outer extremity of the hub cap 38 providing a hump disposed axially outwardly of the bead 43 to prevent outward movement thereof.

In assembling the structure of Figure 4, the cover member 34 may first be lodged in the groove 42 of the member 38 whereupon the cover assembly may be secured to the wheel structure by engagement of the bead 41 of the cover member 38 over the hub 39 of the spider or body part 12. Thereafter, the flange 35 may be slipped over the edge portion 16 of the tire rim and access to the wheel weights 37 or other appurtenances may be attained merely by reversing the last-mentioned operation.

Another aspect of the construction shown in Figure 4 is the possibility of removal of the hub cap portion 38 without removing the cover portion 34. This is accomplished by applying finger pressure to an intermediate part of the cover member 34 to draw the same inwardly in a manner similar to that shown in dotted lines in Figure 1, whereupon the beaded inner edge 43 thereof moves radially outwardly relative to the spider to provide for the insertion of a pry-off tool between the cover portion 38 and the spider 12.

The embodiment shown in Figure 5 is similar to that shown in Figure 4 in that the radially inner peripheral bead 45 of the locally distortable or flexible cover member 46 is maintained upon the wheel structure by means of its engagement with the radially outer extremity of the central hub cap portion 47 which is provided with an axially inwardly extending flange 48 terminating in a bead 49 which is adapted to be urged over and beyond the humps 51 formed on the spider member 12.

In this construction, which is preferably of molded or pressed synthetic plastic or rubber, the radially outer edge is formed to extend obliquely axially inwardly and radially outwardly as at 44 to overlie the edge portion 16 of the tire rim. An axially inwardly extending reenforcing bead 50 having a reenforcing metal ring 50a is formed on the inner surface of the cover member 46 and is so disposed that it underlies the curved inner surface of the edge portion 16 when in its attached position, shown in dotted lines in Figure 5.

Thus it will be seen that the bead 50 may be engaged with the radially inwardly turned, inner surface of the edge portion 16 in snap-on, pry-off relationship so that a substantial interlocking engagement is obtained, this engagement being further augmented by the overlying flange 49.

With such a construction, it will be seen that local flexure of the cover member 46 away from the edge portion 16 to render the rear side of the cover member accessible may be accomplished very easily without the aid of tools.

Here again, as in the construction of Figure 4, it is merely necessary to apply pressure to an intermediate part of the cover member 46 whereby it assumes the position shown in dotted lines in Figure 5 in order to cause the bead 45 to ride radially outwardly on the spider 12, thus to provide access for a pry-off tool for the removal of the hub cap portion 47. Thus it will be seen that removal of the hub cap portion 47 may be accomplished without removal of the cover portion 46 from the wheel structure.

As will be seen from Figure 6, which represents a fragmentary elevation of the inner side of the cover member 46, the latter is provided with a series of orifices 52, so that foreign matter which becomes lodged behind the cover member 46 may be readily emitted therefrom by the action of centrifugal force during the rotation of the wheel structure. From Figure 2 it will be seen that the bead 50 is disposed at that portion of the cover member 46 through which the orifices 52 should extend. Accordingly, in constructing the cover member 46, the bead 50 has spaced portions curved radially inwardly as at 53 in order to provide for the holes 52.

It will be understood that the assembly of the cover structure shown in Figure 5 may be accomplished in the same manner as that described in connection with the assembly of the structure shown in Figure 4.

In the form of my invention shown in Figure 7, the cover portion 54 is formed from flexible sheet stock with a cross-sectional curvature of the character described in connection with the previous forms of my invention. The inner peripheral edge of the cover member 54 is turned back upon the body thereof as at 55 to strengthen the same while the outer peripheral edge is likewise turned back as at 56 to form a bead 57 which encompasses a strengthening rod or wire 58. If desired, the terminal edges of the cover member formed by turning the peripheries thereof, as explained above, may be cemented to the rear surface of the cover member.

This form of the invention differs from the formerly described modifications principally in that the inner reenforced edge 55 of the cover member 54 is adapted to nest behind a bead 59 formed at the periphery of the hub cap portion 60. As will be seen from Figure 7, the hub cap portion 60 is formed with an annular hump 61 which, with the bead 59 thereof, serves to retain the reenforced edge 55 of the cover member 54 in attached relationship thereto.

In assembling the cover members 54 and 60 together the reenforced inner periphery of the member 54 is preferably urged over the bead 59 of the cover member 60 from the inside thereof as viewed in Figure 7 before the cover assembly is mounted upon the wheel. Thus it will be seen that when the flexible cover member 54 is locally distorted by withdrawing the outer periphery thereof away from the tire rim 16, those appurtenances such as the tire valve stem or wheel weights associated with the rim will be available; and furthermore, access will be provided for a pry-off tool which may be inserted inwardly of the bead 59 thereby to pry it axially outwardly from grooves 61 and over humps 62 formed by protuberances 63 in the spider 12.

In the form of the invention shown in Figure 8 the spider 12 is cross-sectionally configurated so as to present a radially outwardly opening groove 64 having an annular bead 65 disposed axially outwardly thereof. The locally deformable cover member 66 is provided at its inner periphery with a substantially axially inwardly extending flange 67 by means of which the cover member is retained in the groove 64 and thus on the wheel structure in snap-on, pry-off relationship.

I have found that the appearance of a massive tire on the wheel tire without necessitating construction of a tire in such massive dimension, and the contiguity of the outer part of the cover member with the side wall of the tire on the rim is greatly augmented if the cover member is extended radially outwardly beyond the edge portion 16 of the tire rim 10. With such a construction, it is desirable that the outer peripheral edge of the cover member bear against the side wall of the tire at a part thereof radially inward of the widest part of the bulge of the tire whereby the cover member is protected against damage when a vehicle is accidentally run against a curb or other obstruction.

To the end that the foregoing feature may be availed of, and in order that the outer peripheral edge of the cover member may be supported by both the tire 17 and the edge portion 16 of the tire rim, the cover portion 66 is provided with a flange 68 which is turned back upon the main portion of the cover member and arranged to lie in surface pressure engagement with the side wall of the tire due to the axially inward position in which the flange member 67 of the cover member is retained by the groove 64 in the spider. The radially inward edge of the flange 68 is turned substantially axially outwardly to form a terminal flange 69 which in turn is drawn radially inwardly against the adjacent surface of the edge portion 16 of the tire rim, thereby to augment the transverse stress imposed upon the body of the cover member by the axially inward position of the inner periphery thereof. Thus it will be seen that I have provided an extremely secure attachment arrangement for the outer peripheral portion of the cover member 66 whereby the entire cover member is securely maintained on the wheel structure under a condition of stress.

If it is desired to gain access to the rear side of the cover member 66, it is merely necessary to engage the radial outer extremity of the cover member with the fingers or with a screw driver and draw the same away from the wheel rim, which movement is permitted by the local flexing of the cover member.

As in the construction shown in Figure 5, the assembly of Figure 8 effectively forms a closed chamber between the tire rim and the cover member, and it is therefore desirable to provide a plurality of orifices 70 at the radially outer extremity of the cover member, whereby foreign matter which becomes lodged behind the cover member may be emitted by virtue of centrifugal force when the wheel is rotating.

It is to be understood that while the constructions of Figures 1 to 7 are preferably pressed or molded from a synthetic plastic, rubber or other flexible material, the construction of Figure 8 is susceptible of being manufactured from the foregoing materials, and may also be formed from a less resilient material such as metal or the like, in which case access to the rear of the cover member is gained by removal of the cover member from the wheel structure unless the metal is so thin and of such quality that local flexure thereof is possible.

From the foregoing, it will be seen that I have provided a novel tire cover construction which is secured to the wheel structure in an improved manner in that the outer peripheral portion thereof is positively engaged by the edge portion 16 of the tire rim 19 or the tire 17, or both; which is of such cross-sectioned curvature and magnitude that when it is white, constitutes in effect the white side wall of a tire on the wheel structure to which it is secured; which, when associated with a hub cap may be locally flexed to afford removal of the hub cap without necessitating removal of the outer portion of the cover assembly; which effectively conceals the outer part of the tire rim together with any appurtenances which might be associated therewith, and yet which affords ready access to the rear side thereof for servicing of the wheel appurtenances and the like.

As indicated previously, the cover member shown herein is resilient in that it is constructed for local flexure and will immediately resume its original form when flexing pressure is released therefrom. In this regard the material from which the cover is constructed may be said to be "rubberlike" and when this term is used in the claims it is to connote the above mentioned characteristics.

I claim as follows:

1. As an article of manufacture, a wheel cover member for disposition over an outer side of a wheel and over the tire rim of a wheel to which it is attached, said cover member having a cross-sectional configuration of such curvature and magnitude so as to constitute in effect a continuation of the side wall of a tire on a wheel to which it is attached and being provided with openings at substantially the radially outer part thereof for affording emission of foreign matter from the rear side thereof under the influence of centrifugal force developed during rotation of the wheel to which it is attached.

2. In a wheel structure having a tire rim and a body part, a cover assembly including an annular portion having a cross-sectional configuration of such curvature and magnitude so as to overlie the outer side of the tire rim and extend radially outwardly over the edge portion thereof, means on the wheel structure for retaining a radially inner part of said cover member on the wheel structure, said cover member being formed so as to provide a flange at the outer part thereof disposed to abut the adjacent portion of the side wall of a tire in the rim, said flange being provided with a terminal part disposed substantially axially of the wheel structure to overlie the radially outer side of the tire rim extending beyond the side wall of the tire.

GEORGE ALBERT LYON.

REFERENCES CITED

The following references are of record in the file of this patent:

UNITED STATES PATENTS

| Number | Name | Date |
| --- | --- | --- |
| 1,494,179 | Matthew | May 13, 1924 |
| 1,743,074 | Roth | Jan. 7, 1930 |
| 1,948,272 | Lyon | Feb. 20, 1934 |
| 1,972,216 | Dowty | Sept. 4, 1934 |
| 2,148,995 | Nelson | Feb. 28, 1939 |
| 2,183,220 | Horn | Dec. 12, 1939 |
| 2,214,747 | Lyon | Sept. 17, 1940 |
| 2,279,331 | Lyon | Apr. 14, 1942 |
| 2,298,669 | Mason | Oct. 13, 1942 |

FOREIGN PATENTS

| Number | Country | Date |
| --- | --- | --- |
| 168,747 | Great Britain | 1921 |